(12) United States Patent
Tanaka et al.

(10) Patent No.: US 11,271,434 B2
(45) Date of Patent: Mar. 8, 2022

(54) RECTENNA DEVICE

(71) Applicant: Mitsubishi Electric Corporation, Tokyo (JP)

(72) Inventors: Toshiyuki Tanaka, Tokyo (JP); Tomohiro Takahashi, Tokyo (JP); Masashi Wada, Tokyo (JP); Hiroshi Osakada, Tokyo (JP); Yukihiro Homma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/291,622

(22) PCT Filed: Sep. 11, 2019

(86) PCT No.: PCT/JP2019/035759
§ 371 (c)(1),
(2) Date: May 6, 2021

(87) PCT Pub. No.: WO2020/137024
PCT Pub. Date: Jul. 2, 2020

(65) Prior Publication Data
US 2022/0014045 A1    Jan. 13, 2022

(30) Foreign Application Priority Data
Dec. 28, 2018 (JP) .................................. 2018-247271

(51) Int. Cl.
*H02J 50/27* (2016.01)
*H01Q 1/36* (2006.01)
*H01Q 1/24* (2006.01)

(52) U.S. Cl.
CPC ............ *H02J 50/27* (2016.02); *H01Q 1/248* (2013.01); *H01Q 1/36* (2013.01)

(58) Field of Classification Search
None
See application file for complete search history.

(56) References Cited

U.S. PATENT DOCUMENTS 9,087,281 B2 * 7/2015 Maguire .......... G06K 19/07767
9,142,881 B1 * 9/2015 Oliver ................ G06K 19/0723
(Continued)

FOREIGN PATENT DOCUMENTS

| JP | 2000-278887 A | 10/2000 |
| JP | 2012-139051 A | 7/2012 |
| JP | 2018-107562 A | 7/2018 |

OTHER PUBLICATIONS

International Search Report and Written Opinion dated Nov. 26, 2019, received for PCT Application No. PCT/JP2019/035759, Filed on Sep. 11, 2019, 6 pages including English Translation.
(Continued)

*Primary Examiner* — Jared Fureman
*Assistant Examiner* — Joel Barnett
(74) *Attorney, Agent, or Firm* — Xsensus LLP

(57) ABSTRACT

A rectenna device includes an antenna (210), a first rectifier (31) to rectify a radio frequency wave input in the antenna (210), an antenna (220), a second rectifier (32) to rectify a radio frequency wave input in the antenna (220), and a capacitive coupler (5) to form an open circuit in response to direct current and to form a short circuit in response to a fundamental wave. The first rectifier (31) includes a ground (GND) conductor (410) to be a reference potential, and the second rectifier (32) includes a GND conductor (420) to be a reference potential. The GND conductor (410) and the GND conductor (420) are connected with the capacitive coupler (5) in between. The first rectifier (31) and the second rectifier (32) are connected in series.

12 Claims, 12 Drawing Sheets

(56) References Cited

U.S. PATENT DOCUMENTS

2013/0249771 A1* 9/2013 Kotter .................... H01Q 1/248
343/893
2016/0181868 A1* 6/2016 Casse ..................... H01Q 1/248
307/104

OTHER PUBLICATIONS

Decision to Grant dated Jul. 21, 2020, received for JP Application 2020-521390, 5 pages including English Translation.

* cited by examiner

RECTENNA DEVICE

CROSS-REFERENCE TO RELATED APPLICATIONS

The present application is based on PCT filing PCT/JP2019/035759, filed Sep. 11, 2019, which claims priority to JP 2018-247271, filed Dec. 28, 2018, the entire contents of each are incorporated herein by reference.

TECHNICAL FIELD

The present disclosure relates to a rectenna device that converts radio frequency waves into direct current power.

BACKGROUND ART

A recterma (rectifying antenna) device is an antenna device with a rectifier circuit. The rectenna device converts radio frequency waves input in the antenna device into direct current (DC) through RF-DC conversion using the rectifier circuit. A rectenna device to be mounted on a power receiver for space solar power systems (SSPS) has recently been under development. A rectenna device including an array of rectenna elements is used preferably for feeding high DC power to a load after receiving high-power radio frequency waves with an antenna and performing highly efficient RF-DC conversion with a rectifier circuit. Rectenna devices that are lightweight and have higher efficiency have thus been awaited.

A known recterma device including rectenna elements includes an antenna bonded to one surface of a dielectric and a rectifier circuit bonded to the other surface of the dielectric with a ground (GND) conductor in between. In one design, the GND conductor is provided on a bonding surface of the back surface of the rectifier circuit that is bonded to the dielectric, and serves as a common GND for the antenna and for the rectifier circuit. The rectenna device including the rectenna elements has the GND commonly used by each rectenna element to achieve a high antenna gain. The GND conductor thus has a large area (see, for example, Patent Literature 1).

CITATION LIST

Patent Literature

Patent Literature 1: Unexamined Japanese Patent Application Publication No. 2018-107562

SUMMARY OF INVENTION

Technical Problem

Although the rectenna elements and the rectenna device described in Patent Literature 1 achieve a high antenna gain with the GND conductor with a large area, each rectifier circuit has a common GND potential. The rectifier circuits are restricted to parallel connection and have a high resultant direct current in the output power. This causes more voltage drop in DC wires and reduces efficiency.

In response to the above issue, an objective of the present disclosure is to provide a rectenna device that causes less voltage drop in DC wires while maintaining a high antenna gain for fundamental waves.

Solution to Problem

A rectenna device according to an aspect of the present disclosure includes a first antenna, a first rectifier to rectify a radio frequency wave input in the first antenna, a second antenna, a second rectifier to rectify a radio frequency wave input in the second antenna, and a first capacitive coupler to form an open circuit in response to direct current and to form a short circuit in response to a fundamental wave. The first rectifier includes a first ground conductor to be a reference potential. The second rectifier includes a second ground conductor to be a reference potential. The first ground conductor and the second ground conductor are connected with the first capacitive coupler in between. The first rectifier and the second rectifier are connected in series.

Advantageous Effects of Invention

The rectenna device according to the above aspect of the present disclosure causes less voltage drop in DC wires while maintaining a high antenna gain for fundamental waves.

DESCRIPTION OF EMBODIMENTS

Figure 1:
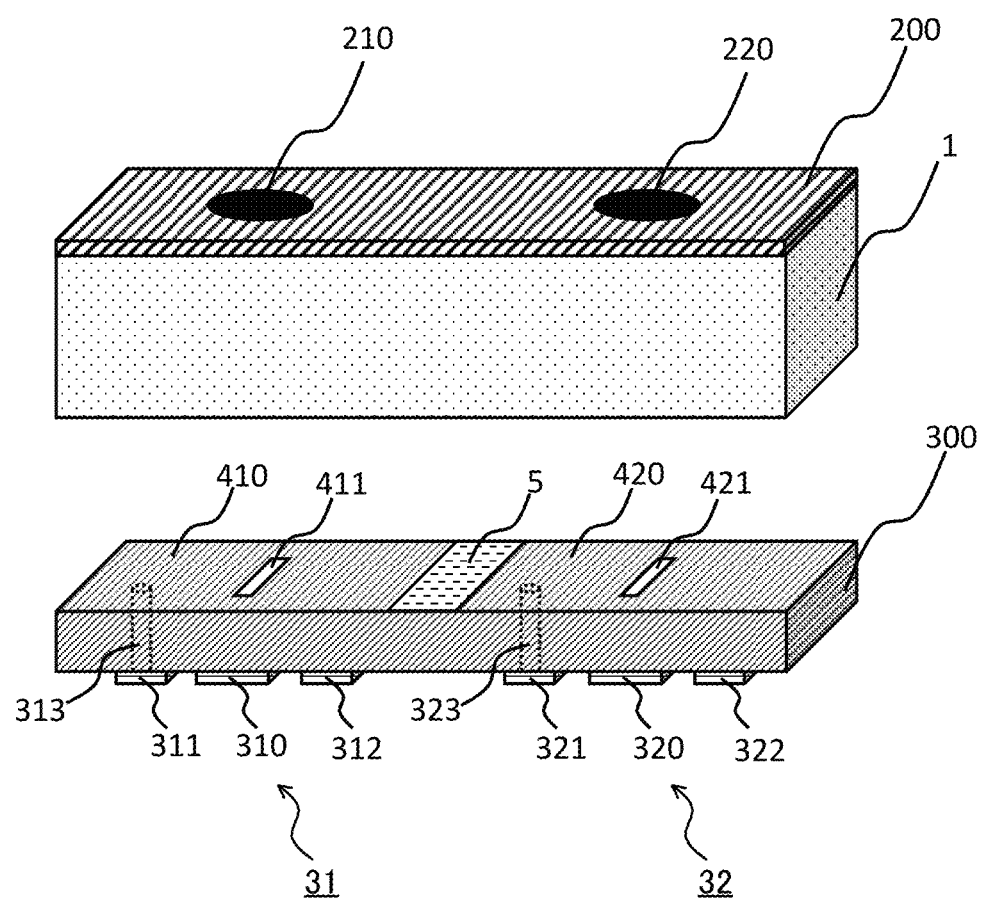
FIG. 1 is a diagram of a configuration of a rectenna device according to Embodiment 1 of the present disclosure.

A rectenna device according to one or more embodiments of the present disclosure will now be described in detail with reference to the drawings. Throughout the drawings, the same or equivalent components are given the same reference numerals.

Embodiment 1

FIG. 1 is a diagram of a configuration of a rectenna device according to Embodiment 1 of the present disclosure. The rectenna device shown in FIGS. 1 to 6 includes two rectifiers. FIG. 7 shows a rectenna device including three rectifiers. The rectenna device in FIGS. 1 to 6 includes an antenna 210 (first antenna), an antenna 220 (second antenna), a first rectifier 31, a second rectifier 32, a dielectric 1, and a capacitive coupler 5 (first capacitive coupler). The first rectifier 31 includes a rectifier circuit (first rectifier circuit) 310 and a ground (GND) conductor 410 (first ground conductor). The second rectifier 32 includes a rectifier circuit (second rectifier circuit) 320 and a GND conductor 420 (second ground conductor). The first rectifier 31 and the second rectifier 32 are adjacent to each other.

The antenna 210 and the antenna 220 receive input radio frequency waves. In this example, input radio frequency waves include waves in a microwave band. As shown in FIG. 1, the antenna 210 and the antenna 220 are adjacent to each other on an antenna board 200. The antenna board 200 has the dielectric 1 bonded to one surface.

Through RF-DC conversion, the rectifier circuit 310 converts radio frequency (RF) waves input in the antenna 210 into direct current, and the rectifier circuit 320 converts RF waves input in the antenna 220 into direct current. The rectifier circuit 310 and the rectifier circuit 320 are located on a rectifier circuit board 300. The rectifier circuit board 300 includes a direct current (DC) negative electrode 311 and a DC positive electrode 312 for outputting direct current generated by the rectifier circuit 310. The rectifier circuit 310 is located between the DC negative electrode 311 and the DC positive electrode 312 in the example shown in FIG. 1, but may be located differently. The rectifier circuit board 300 includes a DC negative electrode 321 and a DC positive electrode 322 for outputting direct current generated by the rectifier circuit 320. The rectifier circuit 320 is located between the DC negative electrode 321 and the DC positive electrode 322 in the example shown in FIG. 1, but may be located differently.

The GND conductor 410 serves as a reference potential for the antenna 210 and the rectifier circuit 310. The GND conductor 410 is located on a surface of the rectifier circuit board 300 opposite to the surface on which the rectifier circuit 310 is located. The GND conductor 420 serves as a reference potential for the antenna 220 and the rectifier circuit 320. The GND conductor 420 is located on a surface of the rectifier circuit board 300 opposite to the surface on which the rectifier circuit 320 is located.

The rectifier circuit board 300 has a through-hole 313. The DC negative electrode 311 for the rectifier circuit 310 is connected to the GND conductor 410 through the through-hole 313. The rectifier circuit 310 outputs power between the DC negative electrode 311 and the DC positive electrode 312. The DC positive electrode 312 has a higher potential than the DC negative electrode 311. The rectifier circuit board 300 has a through-hole 323. The DC negative electrode 321 for the rectifier circuit 320 is connected to the GND conductor 420 through the through-hole 323. The rectifier circuit 320 outputs power between the DC negative electrode 321 and the DC positive electrode 322. The DC positive electrode 322 has a higher potential than the DC negative electrode 321.

The surface of the antenna board 200 to which the dielectric 1 is bonded faces the surface of the rectifier circuit board 300 on which the GND conductors 410 and 420 are located. In other words, the antenna board 200 is bonded to one surface of the dielectric 1, and the rectifier circuit 310 and the rectifier circuit 320 are bonded to the other surface of the dielectric 1 with the GND conductors 410 and 420 in between.

The GND conductor 410 has a slot 411 facing the antenna 210. The slot 411 extends through the GND conductor 410. The slot 411 allows slot coupling of the antenna 210 to the rectifier circuit 310. The GND conductor 420 has a slot 421 facing the antenna 220. The slot 421 extends through the GND conductor 420. The slot 421 allows slot coupling of the antenna 220 to the rectifier circuit 320.

The capacitive coupler 5 is a coupler that forms an open circuit in response to direct current and forms a short circuit in response to fundamental waves. The capacitive coupler 5 is located between the GND conductor 410 and the GND conductor 420. In other words, the GND conductors 410 and 420 are connected with the capacitive coupler 5.

Figure 2:
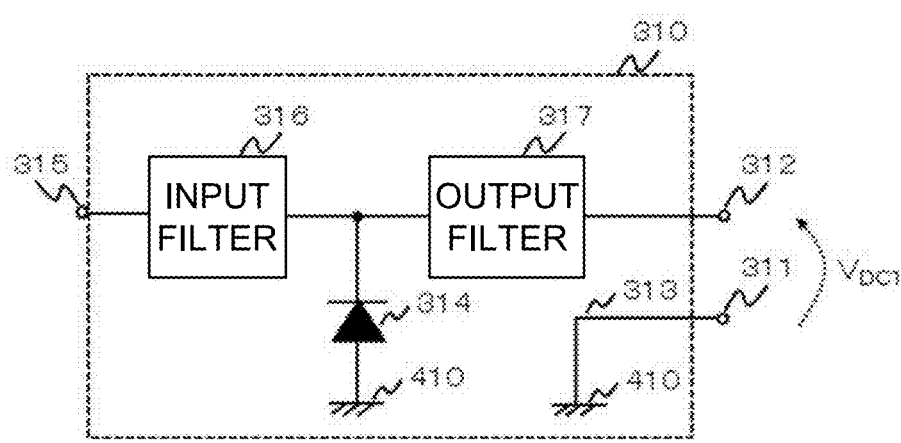
FIG. 2 is a block diagram of a first rectifier according to Embodiment 1 of the present disclosure, showing an example circuit structure.

FIG. 2 shows an example circuit structure of the rectifier circuit 310 in Embodiment 1. The rectifier circuit 310 in this example is a single shunt rectifier as shown in FIG. 2. The rectifier circuit 310 includes an input filter 316, a rectifier element 314, and an output filter 317 between an input terminal 315 and the DC positive electrode 312. The rectifier element 314 has one end connected between the input filter 316 and the output filter 317 and the other end connected to the GND conductor 410. The rectifier element 314 is connected to have the polarity of outputting a positive DC voltage. The rectifier element 314 is, for example, a diode. The DC negative electrode 311 is connected to the GND conductor 410 through the through-hole 313. The DC positive electrode 312 has a higher potential than the DC negative electrode 311. The input filter 316 reduces harmonics generated during rectification. The output filter 317 is a smoothing filter and reduces harmonics generated during rectification.

Figure 3:
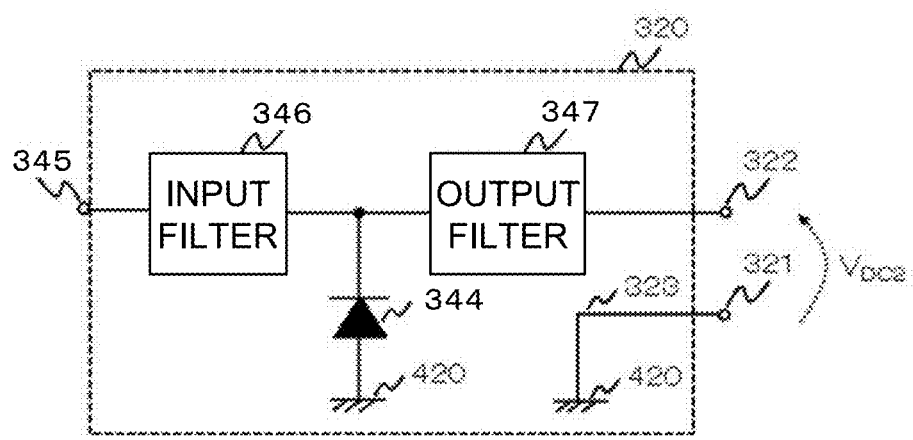
FIG. 3 is a block diagram of a second rectifier according to Embodiment 1 of the present disclosure, showing an example circuit structure.

FIG. 3 shows an example circuit structure of the rectifier circuit 320 in Embodiment 1. The rectifier circuit 320 in this example is a single shunt rectifier as shown in FIG. 3. The rectifier circuit 320 includes an input filter 326, a rectifier element 324, and an output filter 327 between an input terminal 325 and the DC positive electrode 322. The rectifier element 324 has one end connected between the input filter 326 and the output filter 327 and the other end connected to the GND conductor 420. The rectifier element 324 is connected to have the polarity of outputting a positive DC voltage. The rectifier element 324 is, for example, a diode. The DC negative electrode 321 is connected to the GND conductor 420 through the through-hole 323. The DC positive electrode 322 has a higher potential than the DC negative electrode 321. The input filter 326 reduces harmonics generated during rectification. The output filter 327 is a smoothing filter and reduces harmonics generated during rectification.

Figure 4:
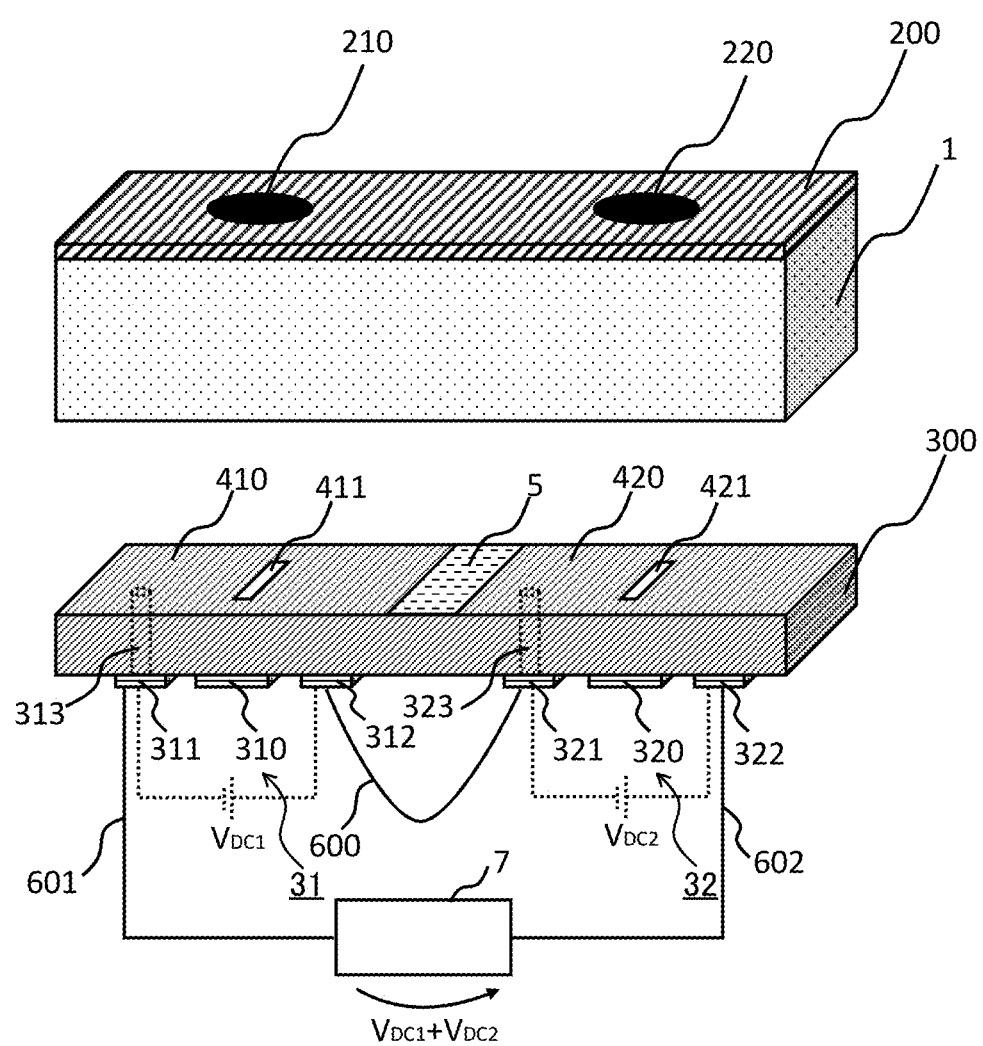
FIG. 4 is a schematic diagram describing the connection between rectifier circuits in the rectenna device according to Embodiment 1 of the present disclosure.

FIG. 4 is a schematic diagram of the recterma device including the first rectifier 31 and the second rectifier 32 that are connected in series. As shown in FIG. 4, a DC wire 600 connects the DC positive electrode 312 for the rectifier circuit 310 to the DC negative electrode 321 for the rectifier circuit 320. A DC wire 601 connects the DC negative electrode 311 for the rectifier circuit 310 to one end of a load 7. A DC wire 602 connects the DC positive electrode 322 for the rectifier circuit 320 to the other end of the load 7. The rectifier circuit 310 and the rectifier circuit 320 are thus connected in series. In other words, the first rectifier 31 and the second rectifier 32 are connected in series.

The capacitive coupler 5 forms an open circuit in response to direct current. Thus, the GND conductors 410 and 420 are electrically fully disconnected from each other while direct current is being provided. In other words, the GND conductors 410 and 420 have different potentials. This allows the rectifier circuit 310 (first rectifier 31) and the rectifier circuit 320 (second rectifier 32) to be connected in series.

The operation of the rectenna device according to Embodiment 1 of the present disclosure will now be described. The rectenna device receives incoming radio frequency waves with the antenna 210 and feeds the radio frequency waves through the slot into the rectifier circuit 310, and receives incoming radio frequency waves with the antenna 220 and feeds the waves through the slot into the rectifier circuit 320. More specifically, the radio frequency waves received with the antenna 210 is fed into the rectifier circuit 310 through the slot 411, whereas the radio frequency waves received with the antenna 220 is fed into the rectifier circuit 320 through the slot 421.

In response to the radio frequency waves input into the input terminal 315 in the rectifier circuit 310 shown in FIG. 2, the rectifier element 314 turns on and off repeatedly in every half cycle, generating high-order harmonics and an offset voltage in the direction corresponding to the polarity of the rectifier element 314. This offset voltage is a DC voltage. The voltage waveform then undergoes a Fourier transform to show direct current and high-order harmonics. The waveform is then processed through the input filter 316 and the output filter 317 to reduce harmonics. The rectifier element 314 thus performs a class-F operation to achieve highly efficient RF-DC conversion. The GND conductor 410 and the DC negative electrode 311 for the rectifier circuit 310 are connected through the through-hole 313. The output filter 317 smooths the waveform of the voltage generated by the rectifier element 314 and outputs a positive DC voltage $V_{DC1}$ between the DC negative electrode 311 and the DC positive electrode 312 for the rectifier circuit 310.

The rectifier circuit 320 shown in FIG. 3 operates in the same manner as the rectifier circuit 310. In response to the radio frequency waves input into the input terminal 345 in the rectifier circuit 320, the rectifier element 344 turns on and off repeatedly in every half cycle, generating high-order harmonics and an offset voltage in the direction corresponding to the polarity of the rectifier element 344. This offset voltage is a DC voltage. The voltage waveform then undergoes a Fourier transform to show DC and high-order harmonics. The waveform is then processed through the input filter 346 and the output filter 347 to reduce harmonics. The rectifier element 344 thus performs a class-F operation to achieve highly efficient RF-DC conversion. The GND conductor 420 and the DC negative electrode 321 for the rectifier circuit 320 are connected through the through-hole 323. The output filter 347 smooths the waveform of the voltage generated by the rectifier element 344 and outputs a positive DC voltage $V_{DC2}$ between the DC negative electrode 321 and the DC positive electrode 322 for the rectifier circuit 320.

As shown in FIG. 4, the rectifier circuit 310 and the rectifier circuit 320 are connected in series. The load 7 thus receives the sum ($V_{DC1}+V_{DC2}$) of the DC voltage $V_{DC1}$ resulting from the RF-DC conversion performed by the rectifier circuit 310 in the first rectifier 31 and the DC voltage $V_{DC2}$ resulting from the RF-DC conversion performed by the rectifier circuit 320 in the second rectifier 32.

The rectifier circuits 310 and 320 that are series-connected can double the voltage applied to the load 7 and halve the current flowing through the load 7, as compared with when they are parallel-connected, with the load 7 receiving the same power. The series-connected circuits allow less direct current to flow than parallel-connected circuit, and cause less output voltage drop in the DC wires 600 to 602. The rectenna device can thus be highly efficient.

The series-connected circuits reduce the direct current supplied to the load 7. In this case, the DC wires 600 to 602 can be wires with a smaller current capacity. With a small conductor area, the DC wires can be lightweight. The rectenna device can thus be lighter.

The antenna characteristics will now be described. To achieve a high antenna gain with the rectenna device, the GND conductor is to absorb all the electric force lines of the fundamental waves generated from the antenna toward the GND conductor. A GND conductor with a greater area can absorb more electric force lines of the fundamental waves.

Figure 5:
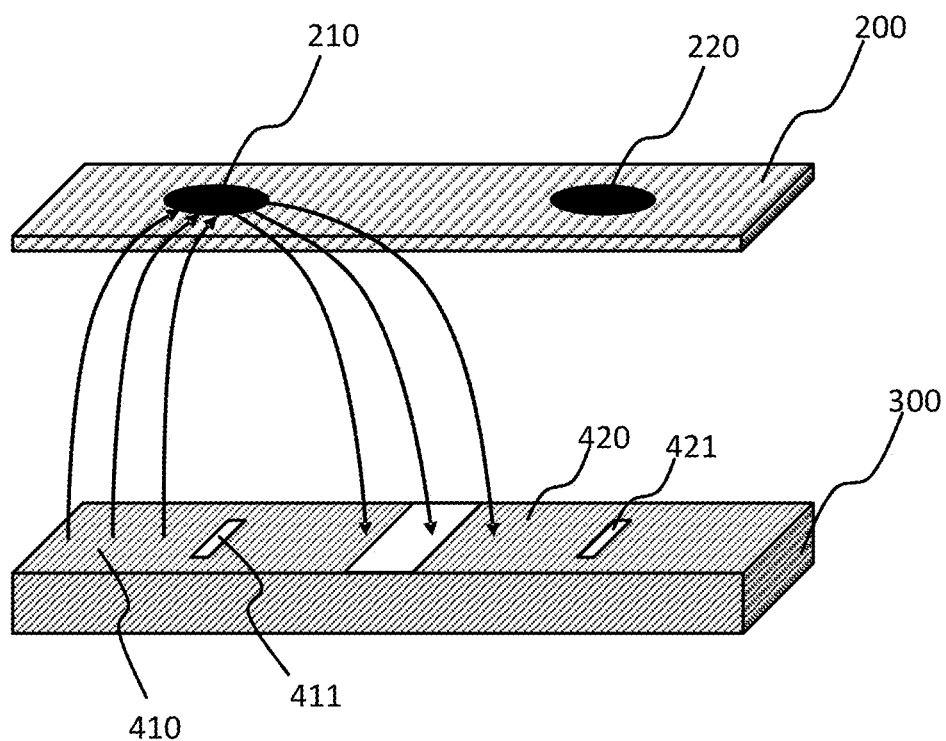
FIG. 5 is a conceptual diagram of electric force lines of fundamental waves generated between an antenna and a GND conductor without a capacitive coupler.

FIG. 5 is a conceptual diagram describing the electric force lines of the fundamental waves generated between the antenna 210 and the GND conductor 410 without the capacitive coupler 5. In FIG. 5, the dielectric 1 is not shown, and the electric force lines are shown clearly.

As shown in FIG. 5, the electric force lines of the fundamental waves generated between the antenna 210 and the GND conductor 410 spread to the area of the GND conductor 420, as well as to the GND conductor 410. Without the capacitive coupler 5, the GND conductors 410 and 420 have different potentials. Thus, the GND conductor 410 alone absorbs the fundamental waves generated from the antenna 210. Without all the generated electric force lines of the fundamental waves being absorbed, the antenna 210 has a lower antenna gain for the fundamental waves.

Similarly, the electric force lines of the fundamental waves generated from the antenna 220 spread to the area of the GND conductor 410, as well as to the GND conductor 420. Without the capacitive coupler 5, the GND conductors 410 and 420 have different potentials. Thus, the GND conductor 420 alone absorbs the fundamental waves generated from the antenna 220. Without all the generated electric force lines of the fundamental waves being absorbed, the antenna 220 has a lower antenna gain for the fundamental waves.

Figure 6:
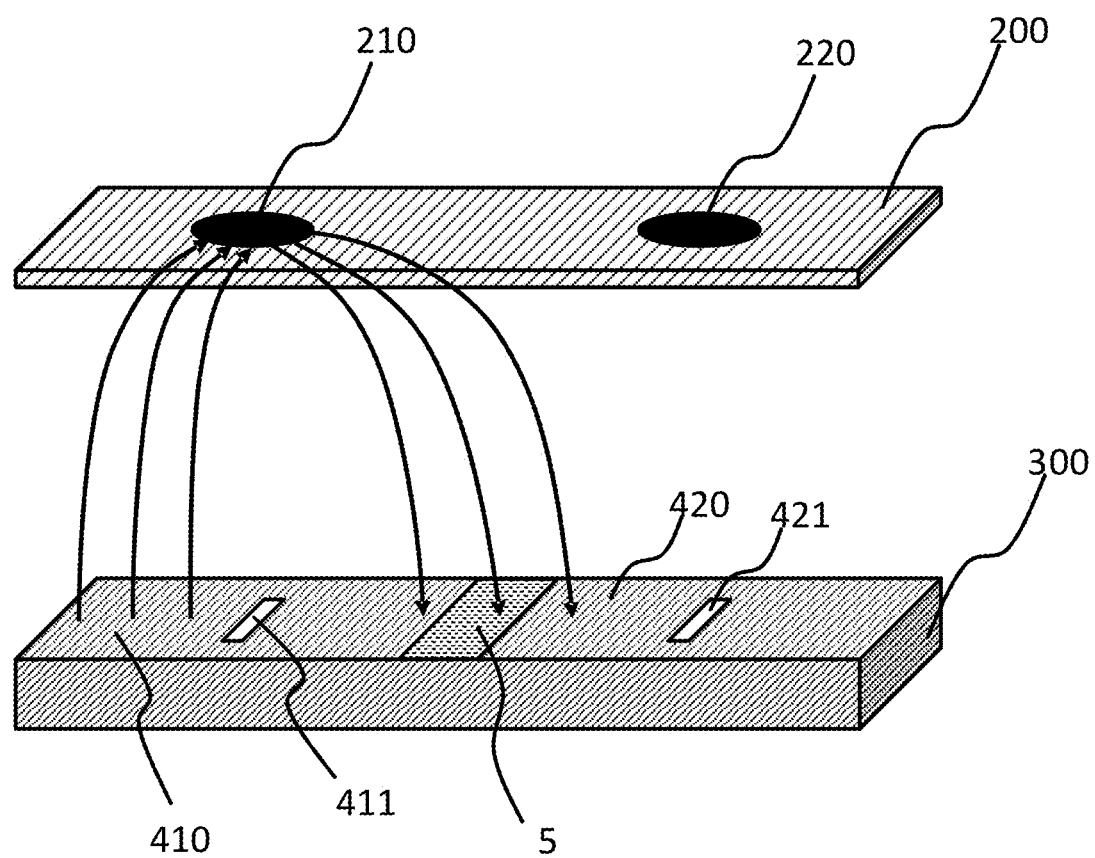
FIG. 6 is a conceptual diagram of electric force lines of fundamental waves generated between the antenna and GND conductors with a capacitive coupler.
Figure 7:
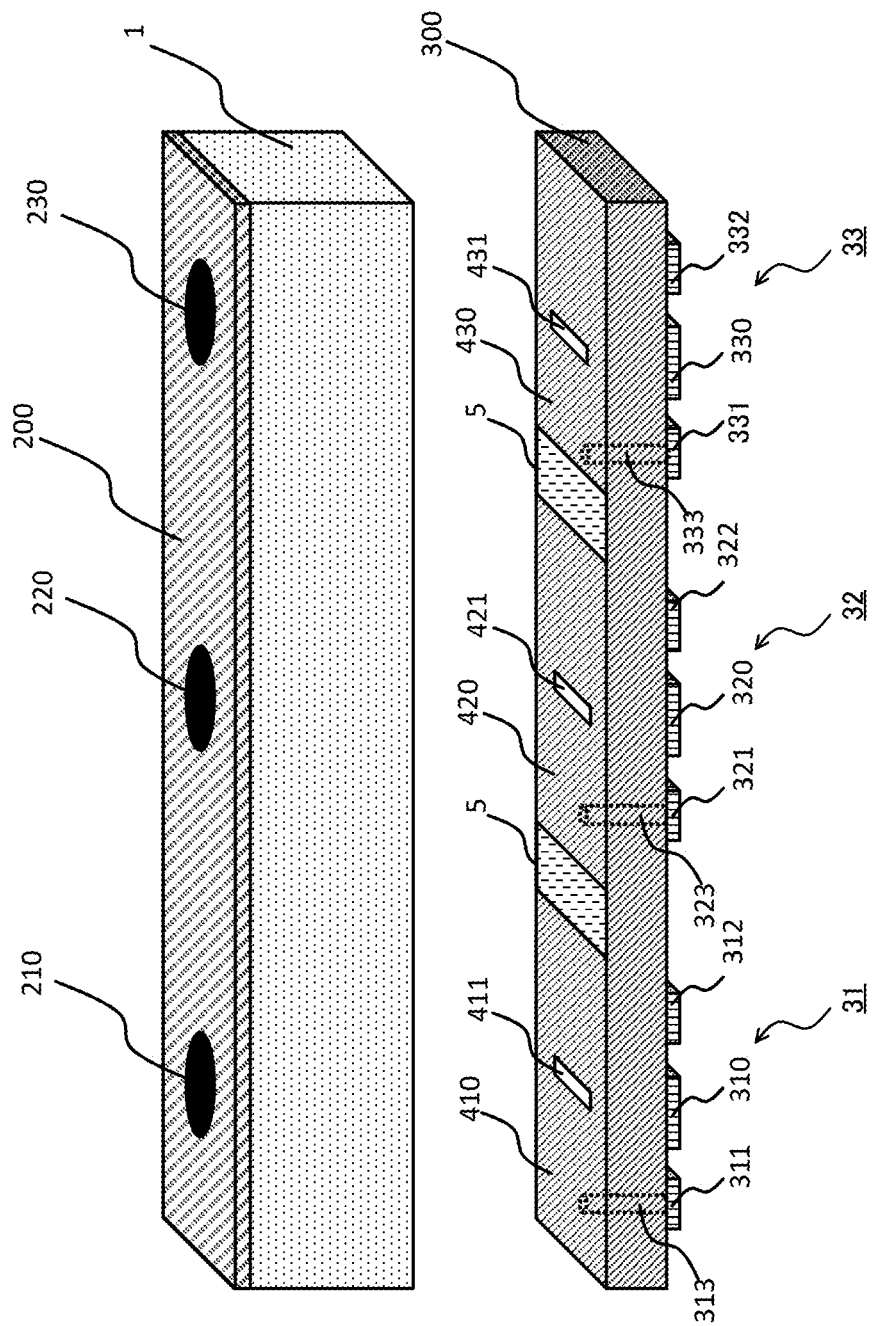
FIG. 7 is a diagram of a configuration of the rectenna device according to Embodiment 1 of the present disclosure including three rectifiers.

FIG. 6 is a conceptual diagram showing the electric force lines of the fundamental waves generated between the antenna 210 and the GND conductors 410 and 420 with the capacitive coupler 5. In FIG. 6, the dielectric 1 is not shown, and the electric force lines are shown clearly.

As shown in FIG. 6, the electric force lines of the fundamental waves generated between the antenna 210 and the GND conductor 410 spread also to the area of the GND conductor 420 as well as to the GND conductor 410. The capacitive coupler 5, forming a short circuit in response to the fundamental waves, causes the GND conductors 410 and 420 to be virtually equipotential for the fundamental waves. As shown in FIG. 6, the GND conductors thus virtually extend across the board surface for the fundamental waves. In other words, the GND conductors 410 and 420 are virtually electrically connected with each other for the fundamental waves. This increases the apparent area of the GND conductors, relative to the antenna 210. Thus, the GND conductors 410 and 420 can both absorb the fundamental waves generated from the antenna 210. The antenna 210 thus achieves a high antenna gain for the fundamental waves.

Similarly, the electric force lines of the fundamental waves generated from the antenna 220 spread also to the area of the GND conductor 410 as well as to the GND conductor 420. This increases the apparent area of the GND conductors, relative to the antenna 220. Thus, the GND conductors 410 and 420 can both absorb the fundamental waves generated from the antenna 220. Thus, the antenna 220 achieves a high antenna gain for the fundamental waves.

The rectenna device according to Embodiment 1 of the present disclosure causes less voltage drop in the DC wires 600 to 602 while maintaining a high antenna gain for the fundamental waves, thus achieving higher efficiency. The DC wires 600 to 602 can also be lighter.

Although the rectenna device includes two rectifiers in FIGS. 1 to 6, the rectenna device may include three or more rectifiers. FIG. 7 is a diagram of a configuration of a rectenna device including three rectifiers. As shown in FIG. 7, the rectenna device further includes a third rectifier 33, an antenna 230 (third antenna), and a capacitive coupler 5 (second capacitive coupler). The third rectifier 33 is adjacent to the second rectifier 32. The third rectifier 33 has the same structure as the first rectifier 31 and the second rectifier 32, and thus is not described in detail.

The third rectifier 33 includes a rectifier circuit 330 and a GND conductor 430 (third ground conductor). The GND conductor 430 serves as a reference potential for the antenna 230 and the rectifier circuit 330. The rectifier circuit board 300 includes a DC negative electrode 331 and a DC positive electrode 332 for the rectifier circuit 330. The DC negative electrode 331 is connected to the GND conductor 430 through a through-hole 333. The GND conductor 430 has a slot 431 facing the antenna 230. The slot 431 extends through the GND conductor 430. The GND conductor 420 (second ground conductor) and the GND conductor 430 (third ground conductor) are connected with the capacitive coupler 5 (second capacitive coupler) in between. The rectifier circuit 320 and the rectifier circuit 330 are connected in series. In other words, the second rectifier 32 and the third rectifier 33 are connected in series.

For such a rectenna device including three or more rectifiers, the capacitive coupler 5 is located between GND conductors in adjacent rectifiers. In other words, the GND conductors in adjacent rectifiers are connected with the capacitive coupler 5 in between. This structure enables series connection of multiple rectifiers.

The rectenna device including three or more rectifiers includes the capacitive couplers 5 that form an open circuit in response to direct current and form a short circuit in response to the fundamental waves. The capacitive couplers 5 each are located between adjacent ones of the GND conductors 410, 420, and 430 to enable series connection of the multiple rectifiers. This structure causes less voltage drop in the DC wires while maintaining a high antenna gain for the fundamental waves, thus achieving higher efficiency. The DC wires can also be lighter. A rectenna device may include more rectifiers to achieve still higher efficiency and be lighter. The rectenna device may be suitable for, for example, space solar power systems (SSPS) or other large rectenna systems with an output power of several thousand kilowatts that include many rectifiers.

Embodiment 2

Figure 8:
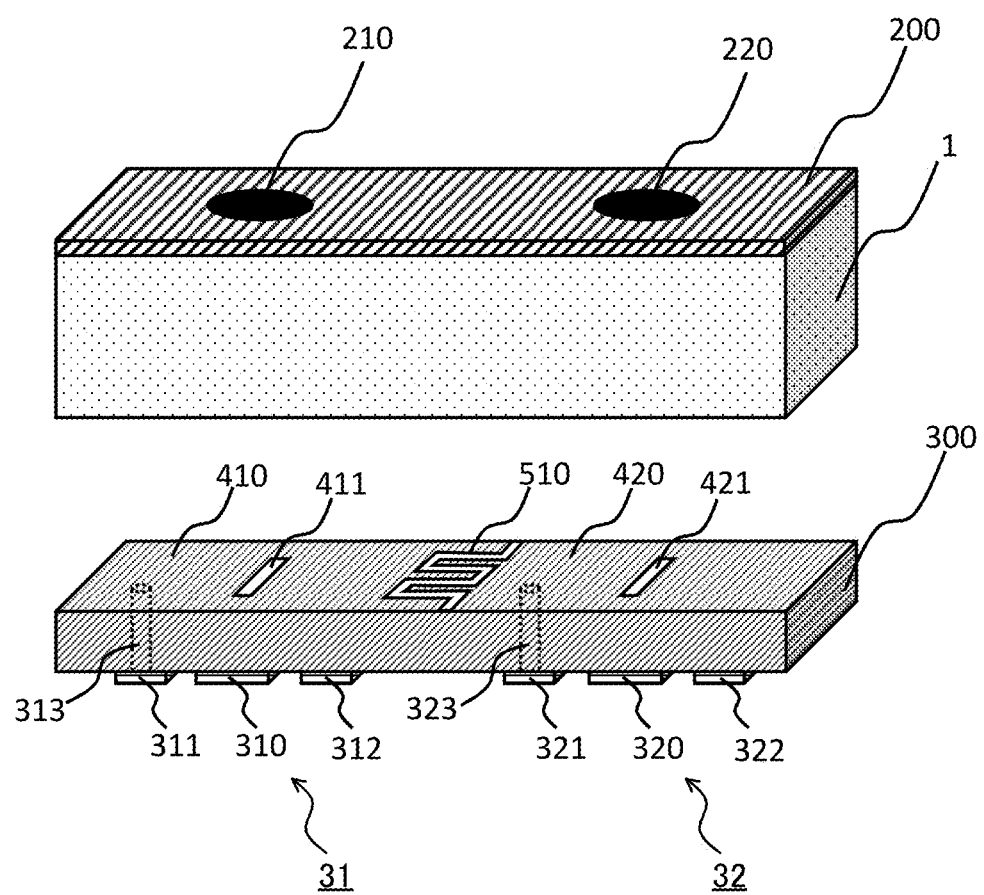
FIG. 8 is a diagram of a configuration of a rectenna device according to Embodiment 2 of the present disclosure.

FIG. 8 is a diagram of a configuration of a rectenna device according to Embodiment 2 of the present disclosure. The present embodiment focuses on the structure of the capacitive coupler 5. In detail, the capacitive coupler 5 includes an interdigital capacitor 510. The other components are substantially the same as those in the rectenna apparatus according to Embodiment 1, and will not be described. The same components are given the same reference numerals.

As shown in FIG. 8, the interdigital capacitor 510 is a coupler including an elongated metal pattern located between the adjacent GND conductors 410 and 420. In other words, the GND conductors 410 and 420 are connected with the interdigital capacitor 510 in between. The interdigital capacitor 510 includes needle-shaped metal pieces alternately arranged near the GND conductor 410 and the GND conductor 420. This structure can generate capacitance between the needle-shaped elongated metal pieces. The capacitance value may be set as appropriate by changing the intervals between the needle-shaped metal pieces, the length of the metal pattern, and the number of needle-shaped metal pieces in the metal pattern. The interdigital capacitor 510 in this example has the pattern that forms a short circuit between the GND conductors 410 and 420 in response to the fundamental waves.

The interdigital capacitor 510 has the needle-shaped metal pieces physically separated apart. An open circuit is thus formed between the GND conductors 410 and 420 in response to direct current. The capacitance value is set to cause a short circuit between the GND conductors 410 and 420 in response to the fundamental waves. In the same manner as with the rectenna device according to Embodiment 1, the rectifier circuit 310 in the first rectifier 31 and the rectifier circuit 320 in the second rectifier 32 can be connected in series.

The recterna device according to Embodiment 2 thus causes less voltage drop in the DC wires while maintaining a high antenna gain for the fundamental waves, thus achieving higher efficiency. The DC wires can also be lighter.

Figure 9:
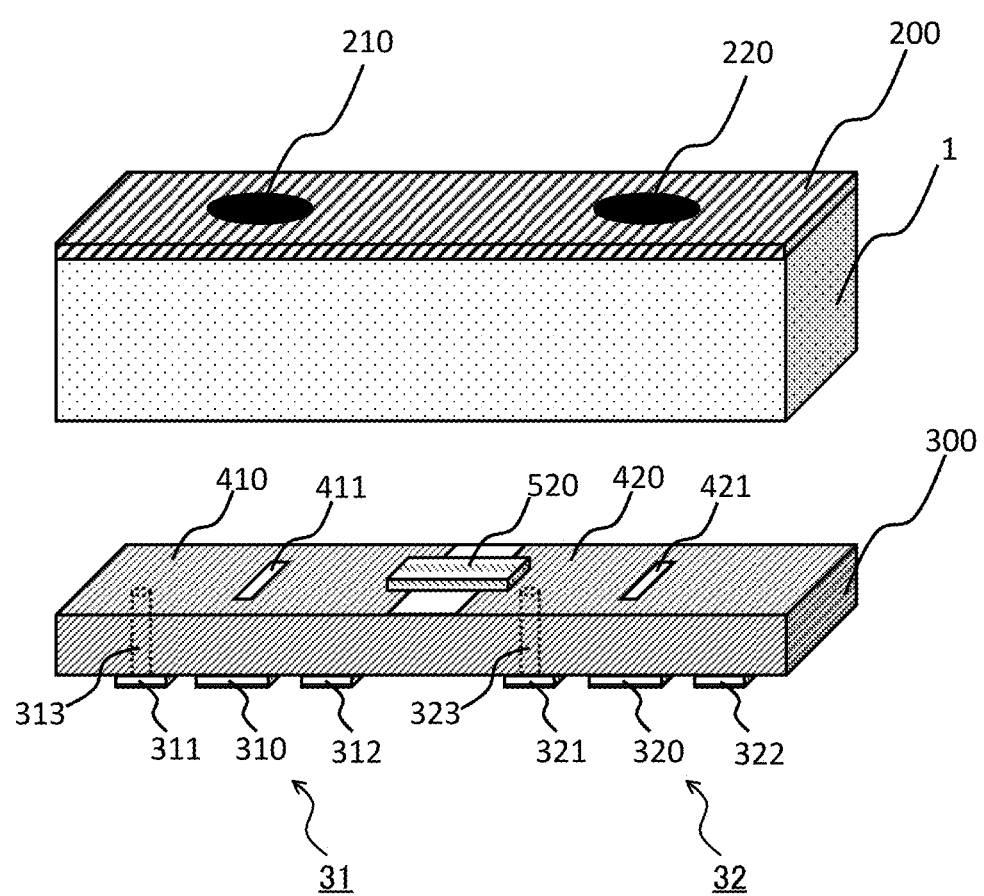
FIG. 9 is a diagram of another configuration of the rectenna device according to Embodiment 2 of the present disclosure.

FIG. 9 is a diagram of a configuration of another rectenna device according to Embodiment 2. The rectenna device shown in FIG. 9 includes the capacitive coupler 5 including a chip capacitor 520. In other words, the interdigital capacitor 510 in the rectenna device shown in FIG. 8 is replaced by the chip capacitor 520.

As shown in FIG. 9, the chip capacitor 520 is located between the adjacent GND conductors 410 and 420. In other words, the GND conductors 410 and 420 are connected with the chip capacitor 520 in between. The chip capacitor 520 forms an open circuit between the GND conductors 410 and 420 in response to direct current. The chip capacitor 520 has a capacitance value set to cause a short circuit between the GND conductors 410 and 420 in response to the fundamental waves. In the same manner as with the rectenna device according to Embodiment 1, the rectifier circuit 310 in the first rectifier 31 and the rectifier circuit 320 in the second rectifier 32 can be connected in series.

Similarly to the rectenna device shown in FIG. 8, the rectenna device with the above structure also causes less voltage drop in the DC wires while maintaining a high antenna gain for the fundamental waves, thus achieving higher efficiency. The DC wires can also be lighter.

Although the rectenna device shown in FIG. 9 includes the single chip capacitor 520, the rectenna device may include multiple chip capacitors.

The rectenna device shown in FIG. 8 includes the capacitive coupler 5 including the single interdigital capacitor 510, and the rectenna device shown in FIG. 9 includes the capacitive coupler 5 including the single chip capacitor 520. The capacitive coupler 5 may include at least one interdigital capacitor 510 or at least one chip capacitor 520. The capacitive coupler 5 may include one interdigital capacitor 510 and one chip capacitor 520 in combination. The capacitive coupler 5 may include multiple interdigital capacitors 510 and multiple chip capacitors 520 in combination.

Embodiment 3

Figure 10:
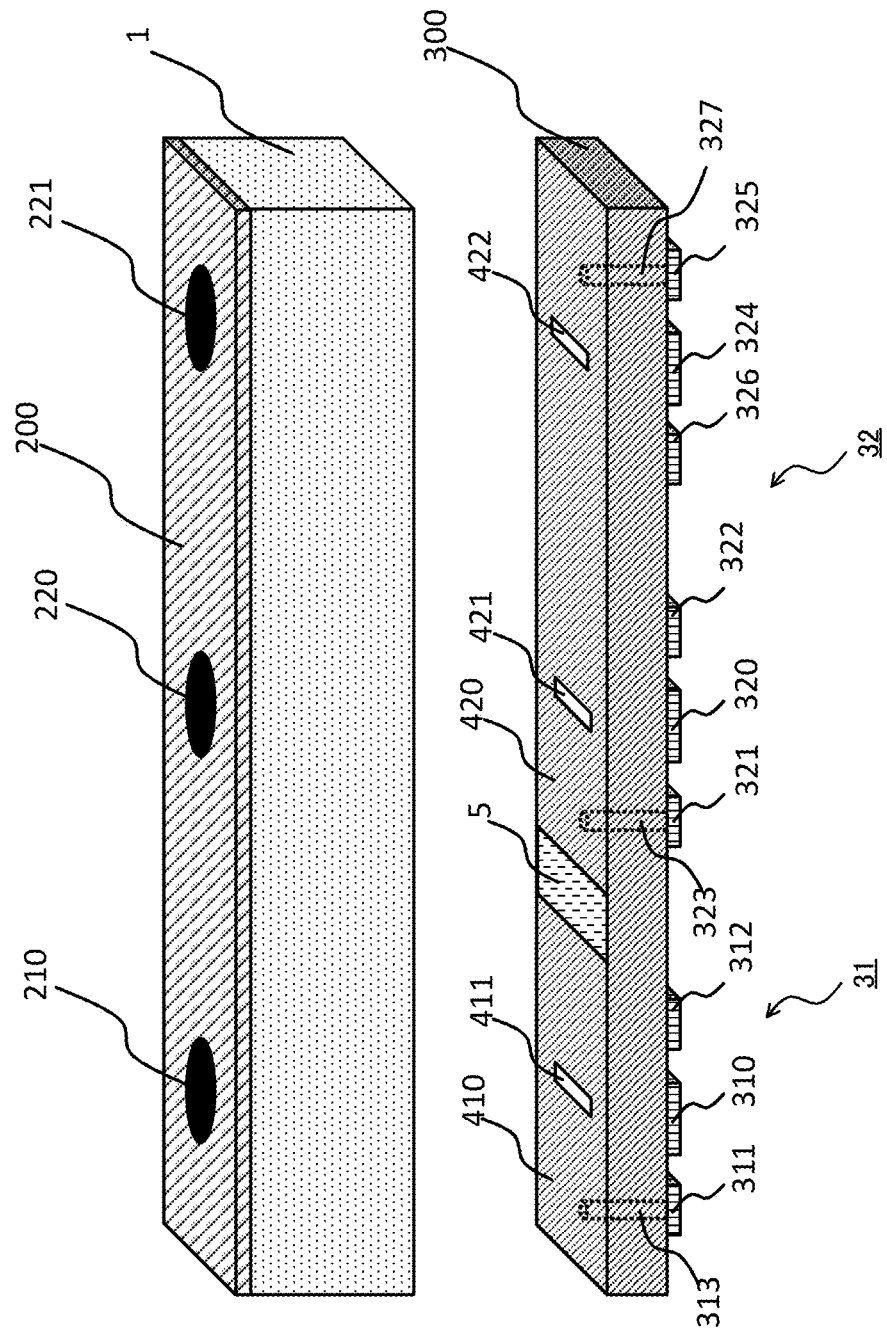
FIG. 10 is a diagram of a configuration of a rectenna device according to Embodiment 3 of the present disclosure.

FIG. 10 is a diagram of a configuration of a rectenna device according to Embodiment 3 of the present disclosure.

The rectenna device according to Embodiment 3 of the present disclosure includes a rectifier including multiple rectifier circuits. The rectenna device shown in FIG. 10 includes a second rectifier 32 including multiple rectifier circuits 320 and 324. In detail, the rectenna device includes an antenna 210 (first antenna), an antenna 220 (second antenna), an antenna 221 (second antenna), a first rectifier 31, a second rectifier 32, a dielectric 1, and a capacitive coupler 5. The first rectifier 31 includes a rectifier circuit 310 (first rectifier circuit) and a GND conductor (first ground conductor) 410. The second rectifier 32 includes a rectifier circuit 320 (second rectifier circuit), a rectifier circuit 324 (second rectifier circuit), and a GND conductor 420 (second ground conductor). The first rectifier 31 and the second rectifier 32 are adjacent to each other.

The second rectifier 32 differs from the second rectifier 32 in Embodiment 1 in including two rectifier circuits 320 and 324. In other words, the rectenna device in Embodiment 3 differs from the rectenna device in Embodiment 1 in further including the antenna 221 and the rectifier circuit 324. The other components are substantially the same as those in Embodiment 1, and will not be described. The same components are given the same reference numerals.

The antenna 221 receives input radio frequency waves. As shown in FIG. 10, the antenna 221 is adjacent to the antenna 220 on an antenna board 200.

Through RF-DC conversion, the rectifier circuit 324 converts the radio frequency waves input in the antenna 221 into direct current. The rectifier circuit 324 is adjacent to the rectifier circuit 320 on a rectifier circuit board 300. The rectifier circuit board 300 includes a DC negative electrode 325 and a DC positive electrode 326 for receiving direct current generated by the rectifier circuit 324. The rectifier circuit 324 is located between the DC negative electrode 325 and the DC positive electrode 326 in the example shown in FIG. 10, but may be located differently. The DC positive electrode 326 has a higher potential than the DC negative electrode 325.

The GND conductor 420 serves as a reference potential for the antenna 221 and the rectifier circuit 324, and for the antenna 220 and the rectifier circuit 320. The GND conductor 420 is located on a surface of the rectifier circuit board 300 opposite to the surface on which the rectifier circuits 320 and 324 are located. The rectifier circuit board 300 has a through-hole 327. The DC negative electrode 325 for the rectifier circuit 324 is connected to the GND conductor 420 through the through-hole 327. In other words, the DC negative electrode 321 for the rectifier circuit 320 and the DC negative electrode 325 for the rectifier circuit 324 are equipotential through the GND conductor 420.

The surface of the antenna board 200 to which the dielectric 1 is bonded faces the surface of the rectifier circuit board 300 on which the GND conductors 410 and 420 are located. In other words, the antenna board 200 is bonded to one surface of the dielectric 1, and the rectifier circuit 310 and the rectifier circuit 320 and 324 are bonded to the other surface of the dielectric 1 with the GND conductors 410 and 420 in between.

The GND conductor 420 has a slot 422 facing the antenna 221. The slot 422 extends through the GND conductor 420. The slot 422 allows slot coupling of the antenna 221 to the rectifier circuit 324.

Similarly to the rectifier circuit 310 and the rectifier circuit 320, the rectifier circuit 324 is a single-shunt rectifier with the same structure as the rectifier circuits 310 and 320 (not shown).

Figure 11:
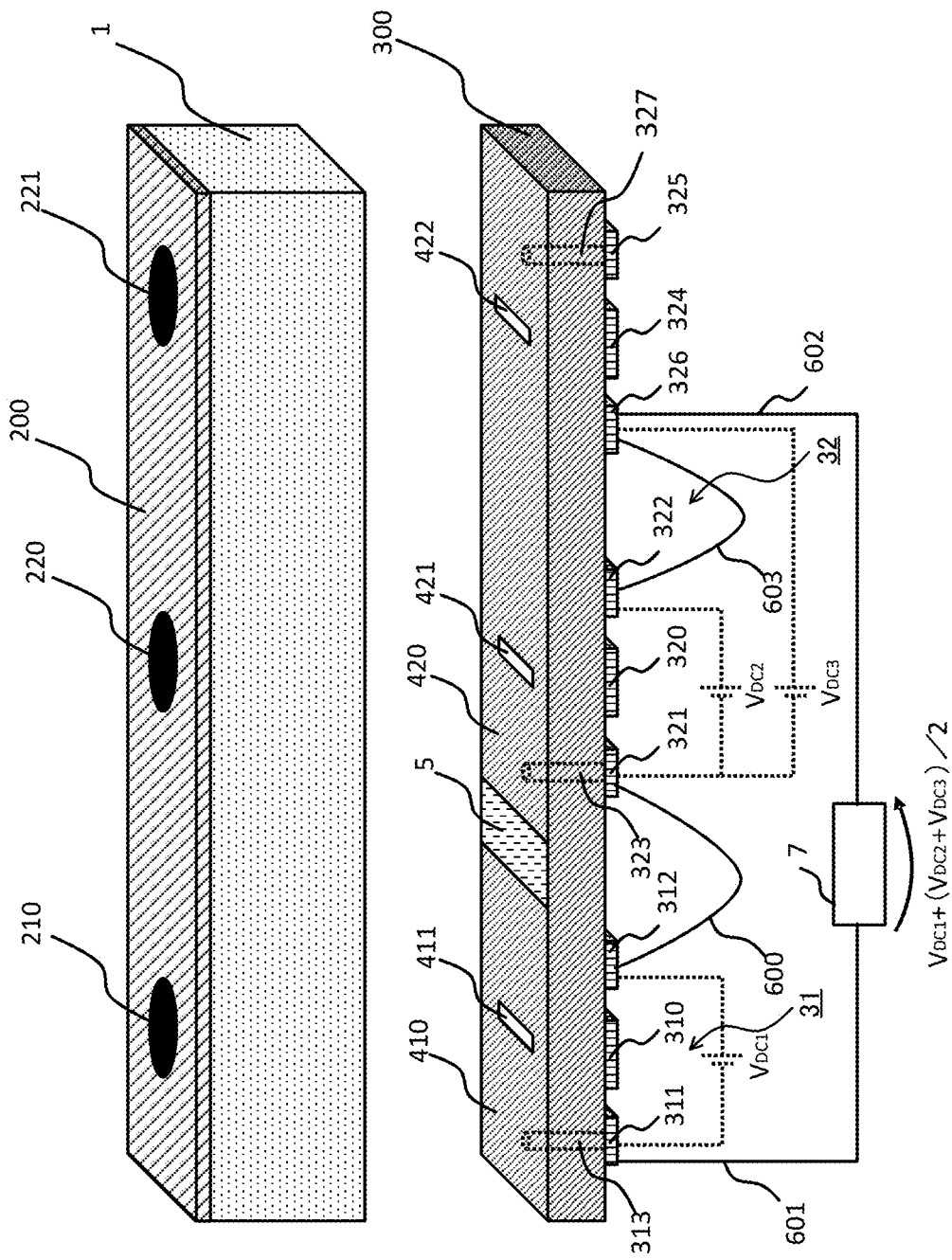
FIG. 11 is a schematic diagram describing the connection between rectifier circuits in the rectenna device according to Embodiment 3 of the present disclosure.

FIG. 11 is a schematic diagram describing the connection between the rectifier circuit 310, the rectifier circuit 320, and the rectifier circuit 324 in the rectenna device according to Embodiment 3. As shown in FIG. 11, a DC wire 600 connects the DC negative electrode 321 serving as a common reference electrode for the rectifier circuits 320 and 324 to the DC positive electrode 312 for the rectifier circuit 310. A DC wire 603 connects the DC positive electrode 322 for the rectifier circuit 320 to the DC positive electrode 326 for the rectifier circuit 324. A DC wire 601 connects the DC negative electrode 311 for the rectifier circuit 310 to one end of a load 7, and a DC wire 602 connects the DC positive electrode 326 for the rectifier circuit 324 to the other end of the load 7. The rectifier circuits 320 and 324 commonly use the GND conductor 420 as a reference potential and are restricted to parallel connection. More specifically, the rectifier circuits 320 and 324 are connected in parallel, and the parallel-connected rectifier circuits 320 and 324 are connected in series to the rectifier circuit 310.

The capacitive coupler 5 forms an open circuit in response to direct current. Thus, the GND conductors 410 and 420 are electrically fully disconnected from each other while direct current is being provided. In other words, the GND conductors 410 and 420 have different potentials. This allows serial connection between the rectifier circuit 310 in the first rectifier 31 and the rectifier circuits 320 and 324 in the second rectifier 32.

The operation of the rectenna device according to Embodiment 3 of the present disclosure will now be described. The rectenna device receives incoming radio frequency waves with the antennas 210, 220, and 221 and feeds the radio frequency waves into the corresponding rectifier circuits 310, 320, and 324 through the corresponding slots 411, 421, and 422. More specifically, the radio frequency waves received with the antenna 210 are fed into the rectifier circuit 310 through the slot 411. The radio frequency waves received with the antenna 220 are fed into the rectifier circuit 320 through the slot 421. The radio frequency waves received with the antenna 221 are fed into the rectifier circuit 324 through the slot 422.

In the same manner as in Embodiment 1, the radio frequency waves fed through the slot into the rectifier circuit 310 undergo RF-DC conversion to output the resultant positive DC voltage $V_{DC1}$ between the DC negative electrode 311 and the DC positive electrode 312. In other words, the first rectifier 31 outputs the DC voltage $V_{DC1}$ from the rectifier circuit 310.

The radio frequency waves fed through the slot into the rectifier circuit 320 undergo RF-DC conversion to output the resultant positive DC voltage $V_{DC2}$ between the DC negative electrode 321 and the DC positive electrode 322. Similarly, the radio frequency waves fed through the slot into the rectifier circuit 324 undergo RF-DC conversion to output the resultant positive DC voltage $V_{DC3}$ between the DC negative electrode 321 and the DC positive electrode 326. As shown in FIG. 11, with the rectifier circuits 320 and 324 connected in parallel, the output voltage between the DC negative electrode 321 and the DC positive electrode 326 is the average voltage $(V_{DC2}+V_{DC3})/2$ of the DC output voltage $V_{DC2}$ from the rectifier circuit 320 and the DC output voltage $V_{DC3}$ from the rectifier circuit 324. In other words, the second rectifier 32 outputs the average voltage $(V_{DC2}+V_{DC3})/2$ of the DC output voltage $V_{DC2}$ from the rectifier circuit 320 and the DC output voltage $V_{DC3}$ from the rectifier circuit 324.

As shown in FIG. 11, the rectifier circuit 310 is connected in series to the parallel-connected rectifier circuits 320 and 324. The load 7 thus receives a DC voltage that is the sum $(V_{DC1}+(V_{DC2}+V_{DC3})/2)$ of the DC voltage $V_{DC1}$ resulting from the RF-DC conversion performed by the rectifier circuit 310 in the first rectifier 31 and the average voltage $(V_{DC2}+V_{DC3})/2$ resulting from the RF-DC conversion performed by the rectifier circuits 320 and 324 in the second rectifier 32.

Thus, the structure of connecting the rectifier circuit 310 in the first rectifier 31 in series to the parallel-connected rectifier circuits 320 and 324 in the second rectifier 32 allows less current to flow through the load than the structure of connecting all the rectifier circuits 310, 320, and 324 in parallel. The circuits allow less direct current to flow through the load, and causes less output voltage drop in the DC wires 600 to 603.

The rectenna device can thus be highly efficient.

Additionally, with a smaller conductor area, the DC wires 600 to 603 can be lightweight. The rectenna device can thus be lighter.

The antenna characteristics will now be described. In the same manner as in Embodiment 1, although the capacitive coupler 5 physically separates the GND conductors 410 and 420 from each other, the capacitive coupler 5 that forms a short circuit in response to the fundamental waves allows the GND conductors 410 and 420 to be virtually equipotential in response to the fundamental waves. In other words, the GND conductors 410 and 420 are virtually electrically connected with each other for the fundamental waves.

This increases the apparent area of the GND conductors, relative to the antenna 210. Thus, the GND conductors 410 and 420 can both absorb the fundamental waves generated from the antenna 210. The antenna 210 thus achieves a high antenna gain for the fundamental waves. In the same manner, the antenna 220 and the antenna 221 achieve a high antenna gain for the fundamental waves.

The rectenna device according to Embodiment 3 of the present disclosure causes less voltage drop in the DC wires 600 to 603 while maintaining a high antenna gain of the antennas 210, 220, and 221 for the fundamental waves, thus achieving higher efficiency. The DC wires 600 to 603 can also be lighter.

Although the rectenna device according to Embodiment 3 includes the second rectifier 32 including two rectifier circuits connected in parallel, the second rectifier 32 may include three or more rectifier circuits connected in parallel. The first rectifier 31 may include multiple rectifier circuits connected in parallel. Each of the first rectifier 31 and the second rectifier 32 may include multiple rectifier circuits connected in parallel.

Figure 12:
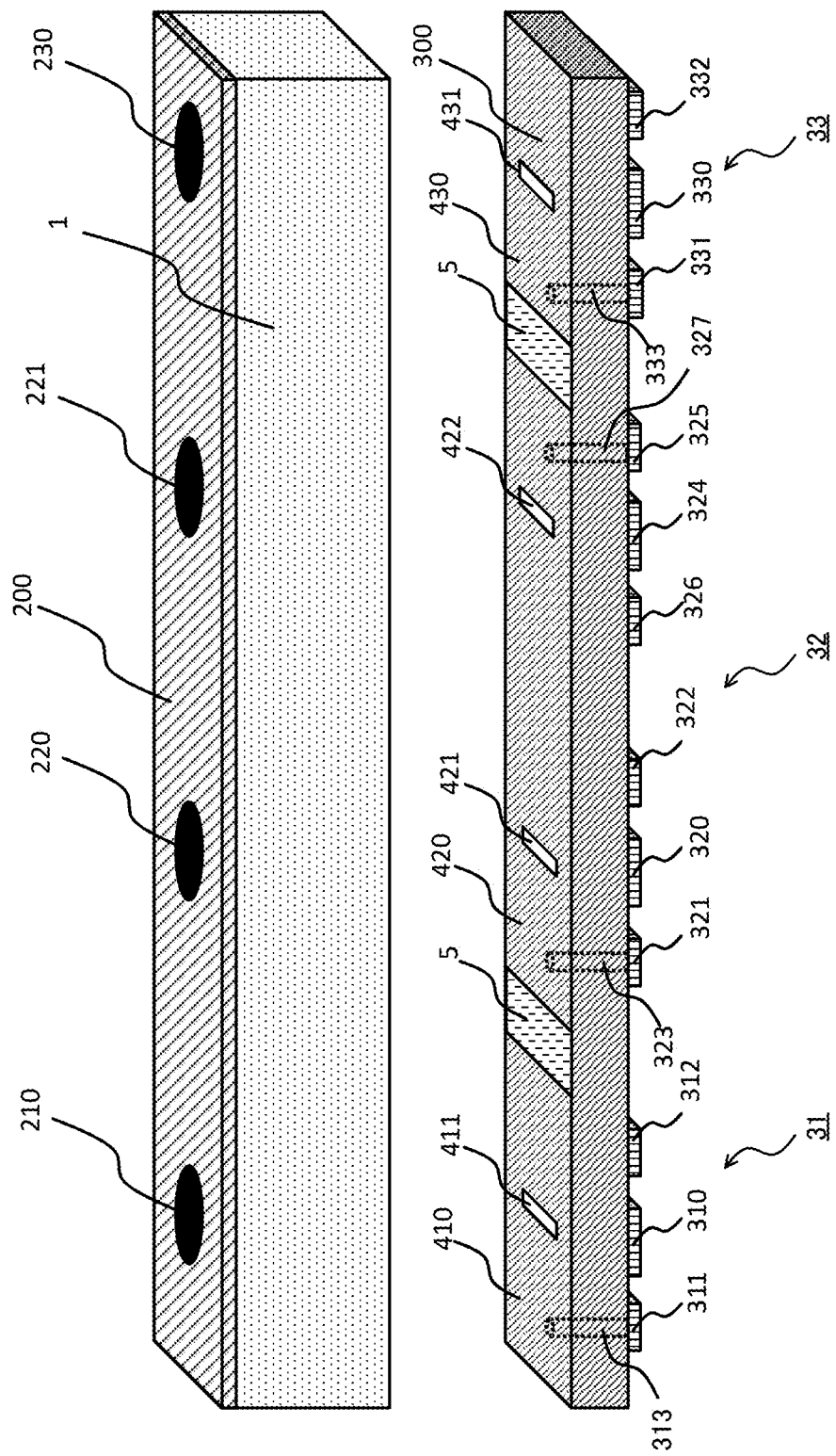
FIG. 12 is a diagram of a configuration of the rectenna device according to Embodiment 3 of the present disclosure including three rectifiers.

In the same manner as in Embodiment 1, the rectenna device may include three or more rectifiers. FIG. 12 is a diagram of a configuration of a rectenna device including three rectifiers. As shown in FIG. 12, the rectenna device further includes a third rectifier 33, an antenna 230 (third antenna), and a capacitive coupler 5 (second capacitive coupler). The third rectifier 33 is adjacent to the second rectifier 32. The third rectifier 33 has the same structure as the first and second rectifiers 31 and 32.

The third rectifier 33 includes a rectifier circuit 330 and a GND conductor 430 (third ground conductor). The GND conductor 430 serves as a reference potential for the antenna 230 and the rectifier circuit 330. The rectifier circuit board 300 includes a DC negative electrode 331 and a DC positive electrode 332 for the rectifier circuit 330. The DC negative electrode 331 is connected to the GND conductor 430 through a through-hole 333. The GND conductor 430 has a slot 431 facing the antenna 230. The slot 431 extends through the GND conductor 430. The GND conductor 420 (second ground conductor) and the GND conductor 430 (third ground conductor) are connected with the capacitive coupler 5 (second capacitive coupler) in between. The rectifier circuit 320 and the rectifier circuit 330 are connected in series. In other words, the second rectifier 32 and the third rectifier 33 are connected in series.

For the rectenna device including three or more rectifiers, the capacitive couplers 5 are located between GND conductors in adjacent rectifiers. In other words, the GND conductors in adjacent rectifiers are connected with the capacitive coupler 5 in between. This structure enables series connection of multiple rectifiers. Any number of sets of series-connected or parallel-connected rectifier circuits may be combined in any manner to include at least one set of series-connected rectifier circuits.

The rectenna device including three or more rectifiers includes the capacitive couplers 5 that form an open circuit in response to direct current and form a short circuit in response to the fundamental waves. The capacitive couplers 5 each are located between adjacent ones of the GND conductors to enable series connection of the multiple rectifiers. This structure causes less voltage drop in the DC wires while maintaining a high antenna gain for the fundamental waves, thus achieving higher efficiency. The DC wires can also be lighter. The rectenna device may include more rectifiers to achieve still higher efficiency and be lighter. The rectenna device may be suitable for, for example, SSPS or other large rectenna systems with an output power of several thousand kilowatts that include many rectifiers.

The capacitive couplers 5 may each include, in the same manner as in Embodiment 2, the interdigital capacitor 510 shown in FIG. 8 or the chip capacitor 520 shown in FIG. 9. The capacitive couplers 5 may each include one interdigital capacitor 510 and one chip capacitor 520 in combination. The capacitive couplers 5 may each include multiple interdigital capacitors 510 and multiple chip capacitors 520 in combination.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-247271, filed on Dec. 28, 2018, the entire disclosure of which is incorporated by reference herein.

REFERENCE SIGNS LIST

1 Dielectric
31 First rectifier
32 Second rectifier
33 Third rectifier
200 Antenna board
210 Antenna (first antenna)
220 Antenna (second antenna)
221 Antenna (second antenna)
230 Antenna (third antenna)
300 Rectifier circuit board 310 Rectifier circuit (first rectifier circuit)
311 DC negative electrode
312 DC positive electrode
313 Through-hole
314 Rectifier element
315 Input terminal
316 Input filter
317 Output filter
320 Rectifier circuit (second rectifier circuit)
321 DC negative electrode
322 DC positive electrode
323 Through-hole
324 Rectifier circuit (second rectifier circuit)
325 DC negative electrode
326 DC positive electrode
327 Through-hole
330 Rectifier circuit
331 DC negative electrode
332 DC positive electrode
333 Through-hole
344 Rectifier element
345 Input terminal
346 Input filter
347 Output filter
410 GND conductor (first ground conductor)
411 Slot
420 GND conductor (second ground conductor)
421 Slot
422 Slot
430 GND conductor (third ground conductor)
431 Slot
5 Capacitive coupler (first capacitive coupler, second capacitive coupler)
510 Interdigital capacitor
520 Chip capacitor
600 DC wire
601 DC wire
602 DC wire
603 DC wire
7 Load

The invention claimed is:

1. A rectenna device comprising:
a first antenna;
a first rectifier to rectify a radio frequency wave input in the first antenna;
a second antenna;
a second rectifier to rectify a radio frequency wave input in the second antenna; and
a first capacitive coupler to form an open circuit in response to direct current and to form a short circuit in response to a fundamental wave,
wherein
the first rectifier includes a first ground conductor to be a reference potential,
the second rectifier includes a second ground conductor to be a reference potential,
the first ground conductor and the second ground conductor are connected with the first capacitive coupler in between, and
the first rectifier and the second rectifier are connected in series.

2. The rectenna device according to claim 1, wherein the first capacitive coupler includes at least one interdigital capacitor.

3. The rectenna device according to claim 2, wherein the first capacitive coupler includes at least one chip capacitor.

4. The rectenna device according to claim 1, wherein the first capacitive coupler includes at least one chip capacitor.

5. The rectenna device according to claim 1, further comprising:
a third antenna;
a third rectifier to rectify a radio frequency wave input in the third antenna; and
a second capacitive coupler to form an open circuit in response to the direct current and to form a short circuit in response to the fundamental wave,
wherein
the third rectifier includes a third ground conductor to be a reference potential,
the second ground conductor and the third ground conductor are connected with the second capacitive coupler in between, and
the second rectifier and the third rectifier are connected in series.

6. The rectenna device according to claim 5, wherein the second capacitive coupler includes at least one interdigital capacitor.

7. The rectenna device according to claim 6, wherein the second capacitive coupler includes at least one chip capacitor.

8. The rectenna device according to claim 5, wherein the first rectifier includes a plurality of first rectifier circuits connected in parallel, and each of the plurality of first rectifier circuits is connected to the first ground conductor.

9. The rectenna device according to claim 5, wherein the second rectifier includes a plurality of second rectifier circuits connected in parallel, and each of the plurality of second rectifier circuits is connected to the second ground conductor.

10. The rectenna device according to claim 5, wherein the second capacitive coupler includes at least one chip capacitor.

11. The rectenna device according to claim 1, wherein the first rectifier includes a plurality of first rectifier circuits connected in parallel, and each of the plurality of first rectifier circuits is connected to the first ground conductor.

12. The rectenna device according to claim 1, wherein the second rectifier includes a plurality of second rectifier circuits connected in parallel, and each of the plurality of second rectifier circuits is connected to the second ground conductor.

* * * * *